US006768413B1

(12) United States Patent
Kemmann et al.

(10) Patent No.: US 6,768,413 B1
(45) Date of Patent: Jul. 27, 2004

(54) CLOSING DEVICE, IN PARTICULAR FOR MOTOR VEHICLES

(75) Inventors: Harald Kemmann, Velbert (DE); Andreas van den Boom, Essen (DE); Stefan Lange, Velbert (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days.

(21) Appl. No.: 09/529,498

(22) PCT Filed: Sep. 3, 1998

(86) PCT No.: PCT/EP98/05597

§ 371 (c)(1),
(2), (4) Date: Apr. 13, 2000

(87) PCT Pub. No.: WO99/19585

PCT Pub. Date: Apr. 22, 1999

(30) Foreign Application Priority Data

Oct. 14, 1997 (DE) ........................................ 197 45 149

(51) Int. Cl.[7] ........................... G06F 7/04; B60R 25/10; B60R 25/00; H02G 3/00

(52) U.S. Cl. ................ 340/5.72; 340/5.62; 340/426.28; 70/237; 307/10.1

(58) Field of Search ............................... 340/5.72, 5.61, 340/5.62, 825.72, 5.7, 5.64, 426.1, 426.28; 70/237, 238, 239

(56) References Cited

U.S. PATENT DOCUMENTS

| | | | | | |
|---|---|---|---|---|---|
| 4,688,036 | A | * | 8/1987 | Hirano et al. | 307/10.5 |
| 4,856,072 | A | | 8/1989 | Schneider et al. | |
| 4,942,393 | A | * | 7/1990 | Waraksa et al. | 340/5.62 |
| 5,844,470 | A | * | 12/1998 | Garnault et al. | 180/287 |
| 5,880,538 | A | * | 3/1999 | Schulz | 307/109 |
| 5,933,086 | A | * | 8/1999 | Tischendorf et al. | 340/5.7 |
| 5,973,611 | A | * | 10/1999 | Kulha et al. | 307/10.1 |

FOREIGN PATENT DOCUMENTS

| | | | |
|---|---|---|---|
| DE | 4016832 | 11/1991 | |
| DE | 4404501 A1 * | 8/1995 | E05B/47/00 |
| DE | 4435894 | 4/1996 | |
| FR | 2590308 | 5/1987 | |
| WO | 9708648 | 3/1997 | |

OTHER PUBLICATIONS

Patent Abstracts of Japan, vol. 097, No. 009, Sep. 30, 1997 & JP 09 125776 A (Tokai Rika Co Ltd), May 13, 1997.

* cited by examiner

*Primary Examiner*—Brian Zimmerman
*Assistant Examiner*—Clara Yang
(74) *Attorney, Agent, or Firm*—Friedrich Kueffner

(57) ABSTRACT

A closing device for a vehicle door lock is actuated by a hand lever. The lock can be switched between a secured, inoperative position of the hand lever and an operative position in which the lock can be opened by the hand lever. An electric control device arranged within the vehicle effects via an antenna of a vehicle-correlated transmission and reception unit a data request directed to a data carrier external to the vehicle held by a vehicle user. The data carrier has a transmission and reception unit transmitting a data reply via the antenna of the vehicle-correlated transmission and reception unit to the control device which, for a positive identification of the data carrier, triggers securing, respectively, release of the lock. The antenna of the transmission and reception unit is arranged in the hand lever in addition to at least some further components of the transmission and reception unit.

14 Claims, 3 Drawing Sheets

CLOSING DEVICE, IN PARTICULAR FOR MOTOR VEHICLES

BACKGROUND OF THE INVENTION

1. Field of the Invention

The invention relates to a closing device where access authorization is detected by a dialog carried out electromagnetically between the transmission and reception units of an electric control device in the vehicle, on the one hand, and of a data carrier, on the other hand, which is external to the vehicle in the possession of the vehicle user. The field of application of the invention is directed especially to vehicles, but is also applicable for accessing safety zones etc.

2. Discussion of the Related Art

In the known device of this kind (WO 97/41322) the antenna as well as the transition and reception unit provided for the dialogue with the external data carrier are located in the interior of the vehicle. The reception and transmission properties of the vehicle-correlated antenna for the dialog with the user-correlated data carrier are unsatisfactory. The installation of the device part within the vehicle is cumbersome and replacement of elements of this device part as well as an exchange between different constructive types of these elements is complicated and therefore not practicable in practice.

SUMMARY OF THE INVENTION

It is an object of the invention to develop a closing device of the aforementioned kind such that it can be easily mounted and is optimized with respect to its functions. This is inventively achieved by arranging the antenna of the vehicle-correlated transmission and reception unit in the hand lever of the door handle.

Because according to the invention the antenna of the vehicle-correlated transmission and reception unit is already integrated in the door handle and is thus in an exposed location of the vehicle, an especially high electromagnetic sensitivity results. The transmission and reception of the electromagnetic signals between the data carrier and the vehicle is optimal. The door handle has the new function of being the support for the antenna and optionally of at least some further components of the vehicle-correlated transmission and reception unit. The previously required space within the vehicle and the installation of corresponding lines have thus been eliminated with the invention. The door handle and at least the antenna form a conveniently pre-mountable constructive unit. By attaching the door handle, which is required anyhow, the antenna is thus already positioned in its required position.

With the invention retrofitting of existing vehicles is also possible, as, for example, the exchange of inventively configured door handles of different constructive designs as they are mentioned in the dependent claims. With the arrangement in the door handle the path of signal transmission between the data carrier and the vehicle is minimized. The antenna characteristic of the antenna integrated into the handle is favorable. Because the door handle projects from the vehicle, an optimal detection area for the communication with the user-correlated data carrier is also provided.

BRIEF DESCRIPTION OF THE DRAWINGS

Further features and advantages of the invention result from the dependent claims, the following description, and the drawings. In the drawings the invention is represented by one embodiment. It is shown in:

DESCRIPTION OF PREFERRED EMBODIMENTS

Figure 3:
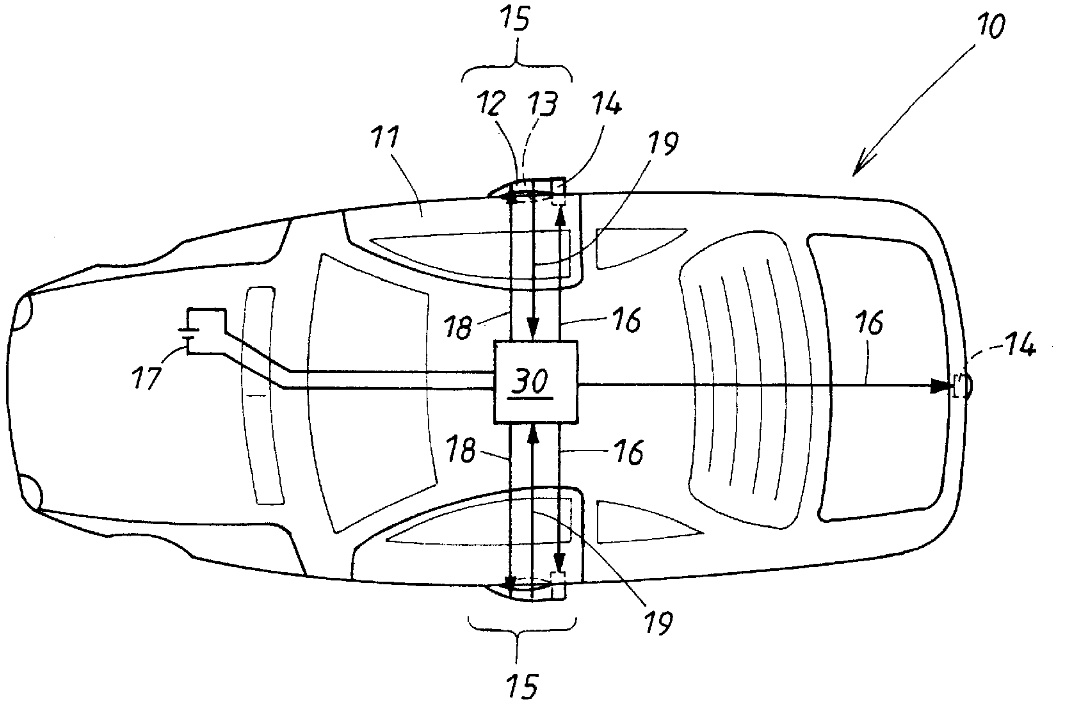
FIG. 3 schematically a vehicle with the integrated part of the closing device according to the invention.
Figure 4:
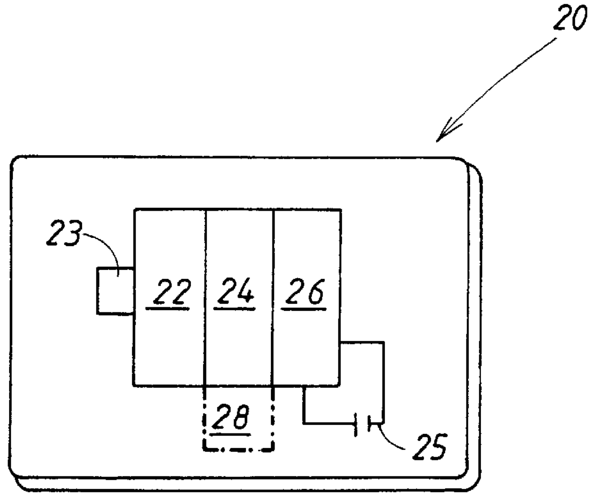
FIG. 4 schematically a data carrier with the integrated further parts of the closing device according to the invention.

The inventive closing device can be divided into two spatially separated parts one of which is arranged in the area of the vehicle 10 and the other in the area of a data carrier 20. The data carrier 20 is initially external to the vehicle, in the possession of the vehicle user. The principal construction of these device parts is shown in FIGS. 3 and 4. The vehicle 10 comprises a door 11 which, in addition to a lock 14, has a door handle 15. The door handle 15 itself is comprised firstly of the actual hand lever 12, which is here embodied as a grip bracket or grip plate. In the area of the hand lever 12 the door 11 can be provided with a hand lever depression 13 which is part of the door handle 15.

The lock 14 can be switched between two different positions. The first position of the lock 14 is a so-called "secured position" wherein the hand lever 12 is inoperative. In the other position of the lock 14 the hand lever 12 is operative; upon actuation of the hand lever 12, the lock is opened. This is the "unsecured position" of the lock 14. This switching of the lock 14 in the present case is performed centrally by an electric control device 30 (shown in FIG. 3) via electrical line conductors 16 which either extend directly to the various locks 14, as indicated in FIG. 3, or indirectly first to a central locking device 35 according to FIG. 5 which, in turn, controls the locks 14.

In the present case the control device 30 has the car battery 17 as its energy supply. In the area of the door handle 15 a sensor is arranged which in the present case operates capacitively and is identified by 31 in the block diagram of FIG. 5. It is understood that, instead of the capacitive sensor 31, sensors of other kinds can be used, for example, those that operate acoustically and respond to the voice of a certain user or to certain words and sounds of any user or to an acoustic device of the user. Instead of such a sensor it is also possible to provide a trigger which operates mechanically and responds to the actuation of the door handle or of a mechanical transmitter arranged in the area of the door handle 15. The object of such a sensor 31 or any other type of trigger is to activate the usually switched-off control device 30. This is referred to as "wake-up" of the control device 30.

In the present case this is achieved by the hand of the user 40 approaching the hand lever 12 of the door handle 15. Between the hand lever 12 and the door 11 in this case an electrical field is built up. When the hand reaches this area, the capacity of the dielectric between the two electrodes is changed which is detected by the capacitive sensor 31. This sensor 31 in the present case is integrated into the hand lever 12. This is a first additional function of the hand lever 12.

The sensor 31 could also be integrated into the area of the hand lever depression 13, i.e., in the area of the door 11.

Figure 5:
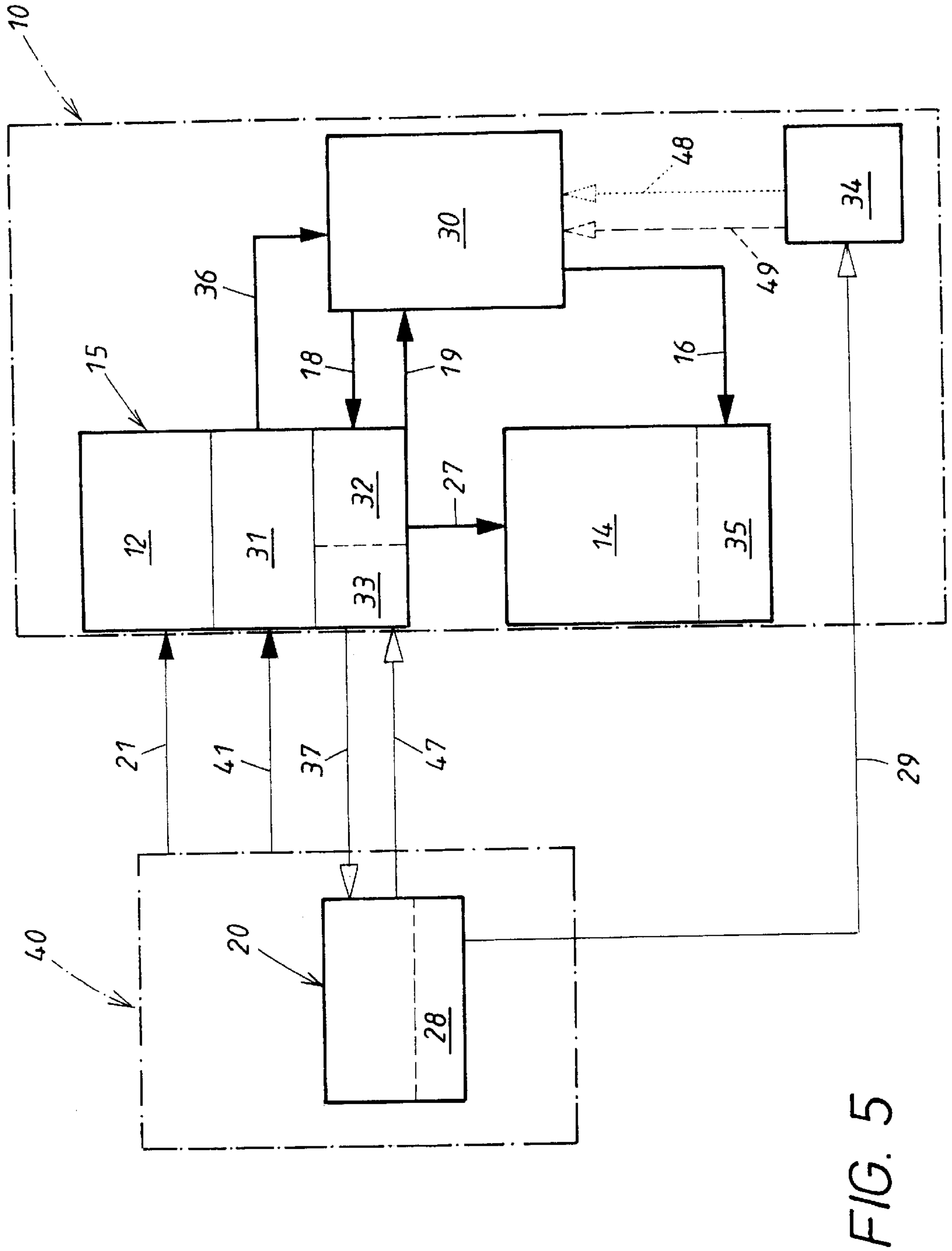
FIG. 5 schematically a block diagram with the operational course between the parts of FIGS. 3 and 4 of the device according to the invention.

In the block diagram of FIG. 5 the vehicle 10 and the vehicle user 40 are firstly illustrated by dash-dotted lines. When the vehicle user 40 approaches the external door handle 15, for example, in that his hand, as illustrated by arrow 41, comes very close to the sensor 31, then the sensor 31 "wakes" via the line 36 illustrated in FIG. 5 the electric control device 30 in the vehicle 10. Via a further electric line 18, also illustrated in FIG. 3, the control device 31 then acts on the vehicle-correlated transmission and reception unit 32 in the area of the door handle 15. This unit 32 also comprises an antenna 33 which is integrated into the door handle 15 and directs electromagnetically a request, indicated by arrow 37, to the data carrier 20 external to the vehicle. In the present case this is carried out in an especially optimal way by the special design of the hand lever 12 explained in more detail in FIGS. 1 and 2.

Figure 2:
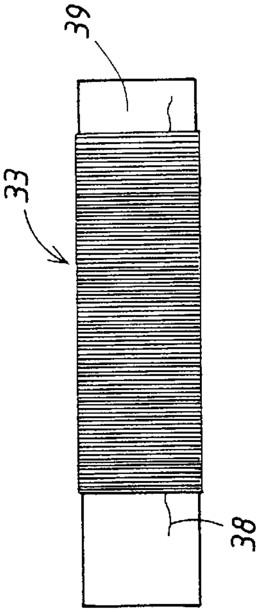
FIG. 2 a plan view onto the antenna component for the hand lever of FIG. 1.

FIG. 2 shows the antenna 33 in a plan view. It is comprised of a coil, optionally a multi-layer coil, of an electrically insulated antenna wire 38 on a ferromagnetic body 39 which is plate-shaped. This inductive antenna 33 is integrated into a component support 42 which has strip conductors on which as many as possible of the components of the transmission and reception unit 32 are arranged and connected to one another. This unit 32 also includes either in the component support 42 or in the adjacent components of the vehicle 10 amplifiers, frequency processing devices for the carrier frequency, modulators for the prescribed transmission signals 37, and demodulators for the reception signals indicated in FIG. 5 by arrow 47 and to be explained in more detail in the following. This antenna 33 is thus integrated into the hand lever 12.

Figure 1:
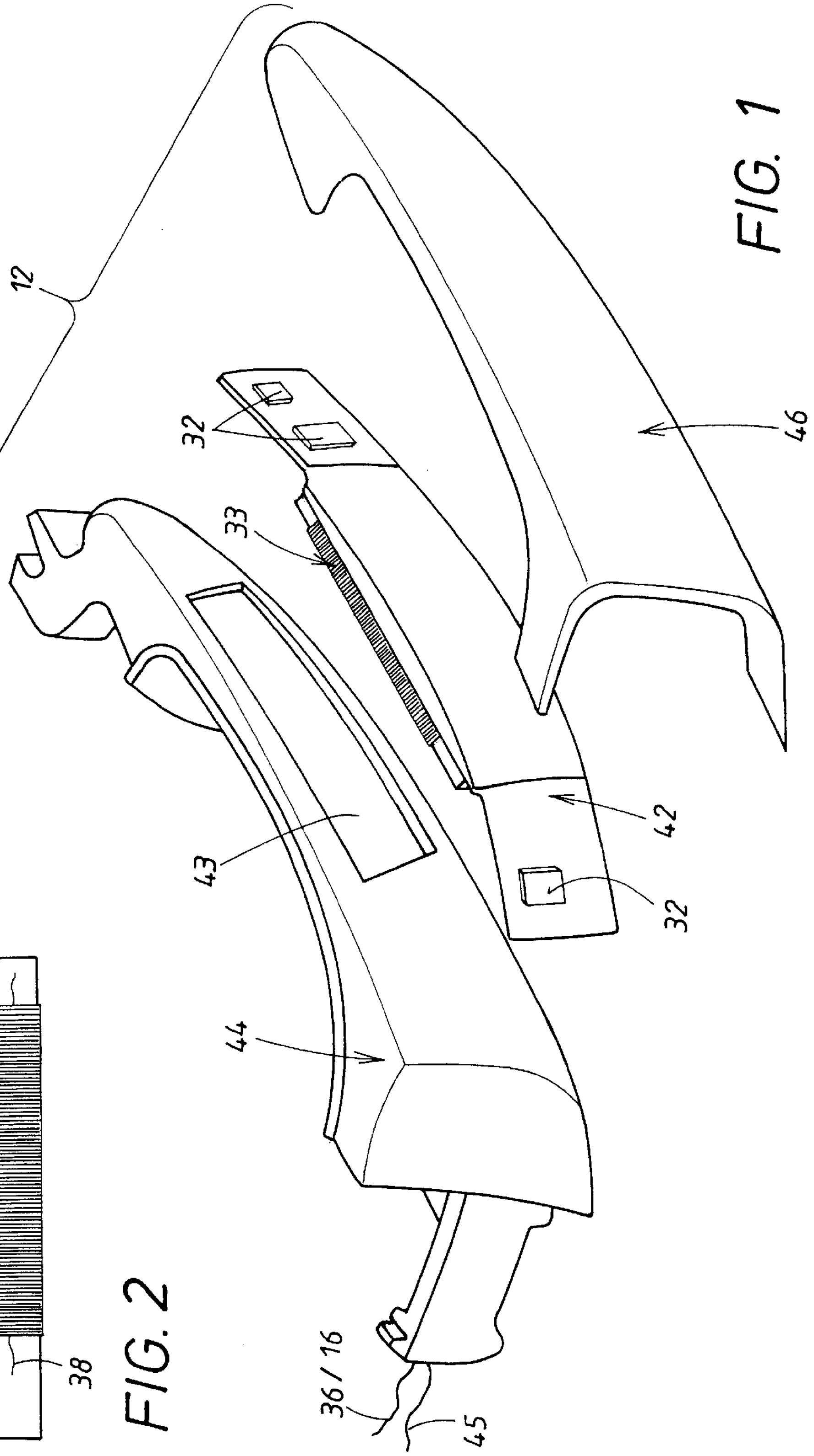
FIG. 1 an exploded view of the components of the hand lever of a door handle according to the invention.

As illustrated in FIG. 1, the hand lever 12 comprises first of all a bracket-shaped base part 44 made of plastic material, on which the component support 42 is mounted. The base part 44 comprises a reception unit 43 for the antenna 33. During assembly contacting of the various lines in the component support 42 with the contact locations, provided at the base part 44, of energy supply lines 45 and the signal lines 36 and/or 16 extending further within the base part 44 can already be realized so that upon mounting of the hand lever 12 in the vehicle 10 they are automatically contacted. After assembly of the parts 42, 44 a cover 46 according to FIG. 1 can be used. Either the antenna 33 or the cover 46, which is, for example, chrome-plated, can also take over the function of one electrode of the afore-described capacitive sensor 31. The hand lever 12, in addition to its function as the actuating member for the lock 14, then also has taken over the two functions, on the one hand, of supporting the antenna 33 and, on the other hand, of being the electrode of the proximity sensor 31. The antenna function of the hand lever 12 optimizes the transmission and reception characteristic of the antenna 33 extraordinarily.

In as much as other sensors are employed for triggering the authentication process to be explained in further detail later, these sensors and at least some of their control means are advantageously also arranged in the hand lever 12 or at least in the area of the door handle 15. When, for example, the acoustic sensors mentioned already supra are used, the sound entry location for this sensor, and optionally the microphone and further electroacoustic transducers, are also integrated into the hand lever 12. Furthermore, the above mentioned mechanical or electric triggers are to be arranged also in the area of the door handle and are preferably integrated into the hand lever 12. Thus, the hand lever 12 with integrated sensors, electrodes, antennas and further functional parts can be completely pre-manufactured. When the vehicle owner decides on a certain version of the inventive closing device which activates either mechanically or capacitively or acoustically the electric control device 30, only the specific desired hand lever 12 must be selected and contacted to the pre-fabricated line conductors within the vehicle 10. The latter can be, as mentioned above, automatically realized by the proper mounting of the hand lever 12.

The data carrier 20 has a design that can be taken from the schematic of FIG. 4. In the data carrier 20 the above described request 37 of FIG. 5 can be received by an antenna 23 provided therein and transmitted to a transmission and reception unit 22 provided therein and which is designed in analogy to that (32) in the vehicle 10. Subsequently, the unit 22 recovers data from a data memory 24 in the data carrier 20 and sends the data via the antenna 23 to the vehicle, this being indicated by the reply arrow 47 in FIG. 5. The data carrier 20 further comprises an electric power supply 25 in an electronic unit 26. The electric power supply 25 can, of course, be a battery. The energy supply can also be provided by induction via the components provided within the vehicle 10. In the case of an internal energy source 25, it can also be charged via the antenna 33 in the vehicle 30, if needed, so that at least an actuation of the lock 14 is possible. Such a charge of the electric power supply 25 can be performed by the antenna 33 itself so that it has been assigned a further third function. For this emergency charging of the energy source in the data memory 20 it is sufficient to bring the data carrier 20 in close proximity to the antenna 33 in the vehicle.

The reply 47 received by the antenna 33 in the door handle is then sent by the vehicle-correlated transmission and reception unit 32 via an electric line 19, shown also in FIG. 3, to the control device 30 where it is processed.

When the control device 30, based on the dialog 37, 47 between the vehicle 10 and the data carrier 20, determines that the user 40 is authorized, a corresponding control pulse is then sent via the already mentioned electrical line 16 directly to the various locks 14 or the central locking device 35 connected to all locks 14. When the locks 14 have been in the afore-described secured position, they are now transferred into the unsecured position by the control pulse sent via 16. When the user, as indicated in the block diagram of FIG. 5 by arrow 21, actuates the hand lever 12, the respective door lock 14 is switched mechanically and/or electrically, as illustrated by the action arrow 27 in the diagram of FIG. 5. The respective door can now be opened by the hand lever 12.

The data carrier 20 can be a component of a keyless authorization which is technically referred to as "passive entry". When the data carrier 20 is brought into close proximity to the door handle 15 of the vehicle 10, the authorization process is triggered. The communication indicated by arrows 37, 47 occurs. A further possibility is to embody the data carrier 20 as a so-called electronic key which triggers the authorization process by a manipulation device on the key, for example, by actuating a button.

In the disclosed embodiment the data carrier 20 in FIG. 5 is also provided with a so-called panic button 28 which can be actuated by the user 40 when the closing or opening function of the vehicle 10 which has been triggered is to be interrupted immediately. The actuation of the panic button 28 initiates a high frequency signal which is indicated in the block diagram of FIG. 5 by arrow 29. Even though the high frequency reception unit in the vehicle 10 could also be provided in the area of the door handle 15, in this case a HF (high frequency) reception unit 34 is provided at a different location in the vehicle 10. As illustrated by the dotted arrow 48, the HF reception unit 34 activates the control unit 30 directly, for which purpose electrical lines are provided. Further electrical lines serve to the received high frequency data, as illustrated by dashed arrow 49.

The control commands transmitted via the lines 16 or 27 to the lock 14, respectively, to the central locking device 35 can act directly onto the electric actuator of the lock 14. However, it is also possible to employ a so-called bus system for the control commands wherein encoded control commands are guided in a uniform line system and, based on their encoding, are then detected and responded to by the various devices.

| List of Reference Numerals: | |
|---|---|
| 10 | vehicle |
| 11 | door of 10 |
| 12 | hand lever of 15 |
| 13 | handle depression of 15 |
| 14 | lock in 11 |
| 15 | outer door handle |
| 16 | line conductor between 14, 30 |
| 17 | car battery in 10 |
| 18 | electrical line between 30, 32 |
| 19 | electrical line between 32, 30 |
| 20 | data carrier |
| 21 | actuation arrow of 12 by 40 |
| 22 | transition and reception unit in 20 |
| 23 | antenna in 20 |
| 24 | data memory in 20 |
| 25 | electric power supply in 20 |
| 26 | electronic unit in 20 |
| 27 | action arrow of 15 on 14 (FIG. 5) |
| 28 | panic button in 20 (FIG. 5) |
| 29 | high frequency signal arrow (FIG. 5) |
| 30 | electric control device |
| 31 | sensor in 30, capacitive sensor |
| 32 | transmission and reception unit in 10 |
| 33 | antenna in 12 |
| 34 | high frequency reception unit |
| 35 | central locking device in 10 for 14 |
| 36 | line between 31, 30 (FIG. 5) |
| 37 | request arrow between 33 and 20 |
| 38 | antenna wire for 33 (FIG. 2) |
| 39 | plate-shaped ferromagnetic body (FIG. 2) |
| 40 | vehicle user (FIG. 5) |
| 41 | proximity arrow of 40 at 15 |
| 42 | component support for 33, 32 in 12 (FIG. 1) |
| 43 | reception unit in 44 for 33 (FIG. 1) |
| 44 | base part of 12 (FIG. 1) |
| 45 | line for energy supply of 32 (FIG. 1) |
| 46 | cover of 12 (FIG. 1) |
| 47 | reply arrow from 20 to 33 (FIG. 5) |
| 48 | activation arrow for 30 by 34 |
| 49 | high frequency data line arrow from 34 to 30 |

What is claimed is:

1. Closing device for a vehicle (10), with a lock (14) arranged at least at one door (11) or a hatch of the vehicle (10), that is actuatable (21) by a vehicle-correlated hand lever (12) of a door handle (15), which hand lever (12) is gripped by a hand of a user for actuating the lock (14), wherein the lock (14) can be switched between a secured position in which the hand lever (12) is inoperative and an operative position in which the hand lever (12) is made operative, in which the lock (14) can be opened by actuating (21) the hand lever (12), with an electric control device (30) arranged within the vehicle (10) that effects via an antenna (33) of a vehicle-correlated transmission and reception unit (32) a data request (37) directed to a data carrier (20) external to the vehicle (10) in the possession of the vehicle user (40), wherein the user-correlated data carrier (20) itself has a transmission and reception unit (32) which transmits a data reply (47) via the antenna (33) of the vehicle-correlated transmission and reception unit (32) to the control device (30), and wherein, in the case of positive identification of the user-correlated data carrier (20), the vehicle-correlated control device (30) triggers (16) securing or release of securing of the lock(s) (14) on at least one door (11) of the vehicle (10), wherein a hollow space forming a receiving unit (43) is arranged in an interior of the hand lever (12), wherein the antenna (33) of the vehicle-correlated transmission and reception unit (32) is arranged in the hollow space in the hand lever (12) of the door handle (15);

wherein, in addition to the complete antenna (33), also at least some further components of the vehicle-correlated transmission and reception unit (32) are arranged in the interior of the hand lever (12) of the door handle (15), the door handle (15) has a hand lever depression (13) and the hand lever (12) extends through the hand lever depression (13) and wherein the antenna (33) and the further components of the vehicle-correlated transmission and reception unit (32) are located outside of the hand lever depression (13) of the door handle (15).

2. Device according to claim 1, wherein the antenna (33) arranged in the door handle (15) is simultaneously embodied as an electrical emergency charge device which can charge an energy storage device (25) provided in the user-correlated data carrier (20).

3. Device according to claim 1, wherein the sensor (31) acts capacitively and has two electrodes, wherein one of the electrodes is arranged in the hand lever (12) of the door handle (15) while the other electrode is arranged in the door (11) or is embodied by the door (11) itself, that between the hand lever (12) and the door (11) an electrical field is built up and the capacity between the two electrodes can be changed by the dielectric of a human hand entering the area of the electrical field and can thereby be sensed.

4. Device according to claim 3, wherein the antenna (33) of the transmission and reception unit (32) of the vehicle is at the same time one of the electrodes of the capacitive sensor (31).

5. Device according to claim 1, wherein the sensor (31) for switching on the control device operates acoustically.

6. Device according to claim 5, wherein the acoustic sensor (31) responds to the voice of a certain user and/or to certain sounds or words of any user or to an acoustic device actuated by the user.

7. Device according to claim 5, wherein the sound entry location for the acoustic sensor (31) and/or the microphone as well as optionally further components of the acoustically operating sensor (31) are arranged adjacent to the door handle (15).

8. Device according to claim 5, wherein the sound entry location and/or at least some components of the acoustically operating sensor (31) are located in the hand lever (12) of the door handle (15).

9. Device according to claim 1, comprising a prefabricated component support (42) containing the antenna (3) and the further components of the vehicle-correlated transmission and reception unit, wherein the component support (42) is arranged in the interior of the hand lever (12).

10. Device according to claim 9, wherein the prefabricated component support (42) in the interior of the hand lever (12) comprises contacts for contacting contact locations of energy supply lines (45) and signal lines (36) and/or (16), wherein the lines extend further in the hand lever (12) behind the contact locations, and wherein the further extending lines are automatically contacted when the hand lever (12) is mounted in the vehicle (10).

11. Device according to claim 10, wherein the hand lever (12) is comprised of a base part (44) and a cover part (46), wherein the hollow space forming the reception unit (4) for the component support (42) is arranged between the base part (44) and the cover part (46), and wherein the lines extending from the contact location extend further in the base part (44).

12. Closing device for a vehicle (10), with a lock (14) arranged at least at one door (11) or a hatch of the vehicle (10), that is actuatable (21) by a vehicle-correlated hand lever (12) of a door handle (15), which hand lever (12) is gripped by a hand of a user for actuating the lock (14), wherein the lock (14) can be switched between a secured position in which the hand lever (12) is inoperative and an operative position in which the hand lever (12) is made operative, in which the lock (14) can be opened by actuating (21) the hand lever (12), with an electric control device (30) arranged within the vehicle (10) that effects via an antenna (33) of a vehicle-correlated transmission and reception unit (32) a data request (37) directed to a data carrier (20) external to the vehicle (10) in the possession of the vehicle user (40), wherein the user-correlated data carrier (20) itself has a transmission and reception unit (22) which transmits a data reply (47) via the antenna (33) of the vehicle-correlated transmission and reception unit (32) to the control device (30), and wherein in the case of positive identification of the user-correlated data carrier (20) the vehicle-correlated control device (30) triggers (16) securing or release of securing of the lock(s) (14) on at least one door (11) of the vehicle (10), wherein a hollow space forming a receiving unit (43) is arranged in an interior of the end lever (12), wherein the antenna (33) of the vehicle-correlated transmission and reception unit (32) is arranged in the hollow space in the hand lever (12) of the door handle (15);

wherein, in addition to the complete antenna (33), also at least some further components of the vehicle-correlated transmission and reception unit (32) are arranged in the interior of the hand lever (12) of the door handle (15), further comprising a component support (42) containing the antenna (3) and the further components of the vehicle-correlated transmission and reception unit, wherein the component support (42) is arranged in the interior of the hand lever (12), the door handle (15) has a hand lever depression (13) and the hand lever (12) extends through the hand lever depression (13) and wherein the antenna (33) and the further components of the vehicle-correlated transmission and reception unit (32) are located outside of the hand lever depression (13) of the door handle (15).

13. Device according to claim 12, wherein the prefabricated component support (42) in the interior of the hand lever (12) comprises contacts for contacting contact locations of energy supply lines (45) and signal lines (36) and/or (16), wherein the lines extend further in the hand lever (12) behind the contact locations, and wherein the further extending lines are automatically contacted when the hand lever (12) is mounted in the vehicle (10).

14. Device according to claim 13, wherein the hand lever (12) is comprised of a base part (44) and a cover part (46), wherein the hollow space forming the reception unit (4) for the component support (42) is arranged between the base part (44) and the cover part (46), and wherein the lines extending from the contact location extend further in the base part (44).

* * * * *